Oct. 3, 1961
Filed Dec. 24, 1957

R. H. JARVIS
PROCESS OF AND APPARATUS FOR PRODUCING
FINELY-DIVIDED METALS

INVENTOR.
Ralph Herbert Jarvis 3,002,898
PROCESS OF AND APPARATUS FOR PRODUCING FINELY-DIVIDED METALS
Ralph Herbert Jarvis, 5246 E. Florence Ave., Bell, Calif.
Filed Dec. 24, 1957, Ser. No. 705,045
22 Claims. (Cl. 204—10)

The present invention relates to a process and apparatus for producing finely-divided metals and colloidal metals.

In the past a great many processes have been discovered for producing finely-divided metals; i.e., see the latest books and treatises on powder metallurgy; wherein a great many processes are described for producing finely-divided metals. Finely-divided metals, such as are used in powder metallurgy, are about 0.0015 inch in diameter.

Additionally, a few processes have been discovered for producing colloidal metals; colloidal metals are about from 0.0001 inch to 0.00000015 inch in diameter.

In the following paragraph a partial description of the science involved in the present invention will be described.

In the present invention a double revolving cathode is used. To produce a double cathode, I form a cathode composed of a film of oil and mercury particles upon a carbon or graphite cathode. I may employ other substances in a finely-divided state besides mercury particles; such as sodium amalgam, potassium amalgam, calcium amalgam, ammonium amalgam particles, etc.

As can be readily understood, in producing colloidal metals in the present invention, certain definite rules have to be followed; and they are approximately as follows:

(1) The cathode must revolve very fast to make the process economically possible;

(2) The cathode and the anode must be approximately the same length; i.e., the portion of the cathode, that is, submerged in the electrolyte and the anode must be approximately the same length;

(3) The cathode must be submerged to the minimum in the electrolyte.

The objects of the present invention are the following:

The production of finely-divided and colloidal metals; which may be used as paint pigments and; additionally, as a cement filling material in powder metallurgy, etc.

Other objects of the present invention will be apparent from the following description and the accompanying drawings in which.

Figure 1:
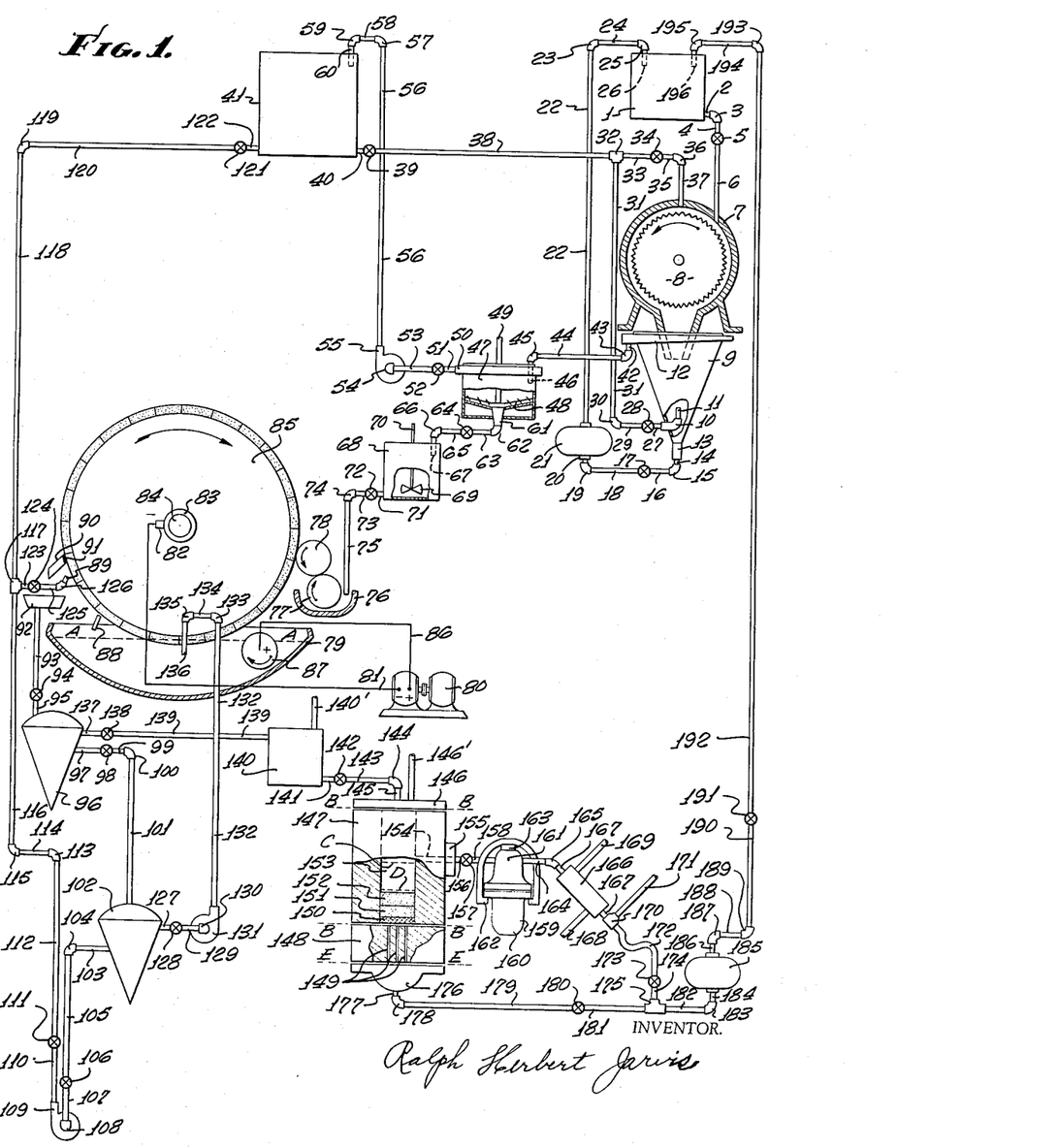
FIGURE 1 is a diagrammatic flow sheet showing one embodiment of my invention.

Referring to FIGURE 1, I will describe the present invention, wherein mercury conductive particles will be used; hereafter, in the specification and claims I will refer to the particles, as (conductive particles) i.e., as above, mercury conductive particles.

In the specification, hereinafter, I will employ the phraseology of pipefitters, plumbers, etc., in regards to the pipe and pipe fittings employed in the present invention; i.e., the following expressions (facing up, or facing down of elbows, a piece of pipe facing down, etc.).

Referring to FIGURE 1, 1 is a tank containing mercury. 2 is a pipe nipple which fixes 1 to 3 an elbow. 4 is a pipe nipple which fixes 3 to valve 5. 6 is a pipe leading from 5 to within rotor case 7; 7 is an elevation in section, taken along the approximate center of the rotor case, 8 is a rotor with teeth machined in the circumference thereof. 9 is a cone classifier of the up-flowing type; see books and articles on hydraulic classification, as to construction and operation of cone classifiers. The cone classifier is broken away showing elbow 10; which is facing up, or in a vertical position. 11 is a short piece of pipe fixed to 10 in a vertical position, and in the center of the cone. 12 is an overflow launder, which completely surrounds the cone classifier; and is inclined or slopes towards the left-hand side or discharge side thereof.

13 is an opening in the bottom of cone classifier 9; whereto pipe nipple 14 is fixed. Elbow 15 is fixed to pipe nipple 14. 16 is a pipe nipple which fixes valve 17 to 15. 18 is a nipple which fixes 17 to elbow 19. 20 is a pipe nipple which fixes 19 to 21 a gear pump. 22 is a pipe leading from 21 to 23 an elbow. 24 is a pipe fixing 23 to 25 an elbow. 26 is a short piece of pipe facing down, and fixed to 25 and discharges into tank 1.

27 is a pipe nipple which fixes 10 to valve 28. 29 is a pipe nipple which fixes 28 to elbow 30. 31 is a pipe which fixes 30 to T 32. 33 is a pipe nipple which fixes 32 to valve 34. 35 is a pipe nipple which fixes 34 to elbow 36. 37 is a pipe which goes through rotor housing 7, and is fixed to 36. 38 is a pipe which fixes 32 to valve 39. Pipe nipple 40 fixes 39 to tank 41.

42 is a pipe nipple fixed to the bottom of overflow launder 12. 43 is an elbow fixed to 42. 44 is a pipe which fixes 43 to elbow 45. 46 is a piece of pipe fixed to 45 and faces down into Dorr thickener 47. Dorr thickener 47 is broken away showing rakes 48 therein. 49 is the drive shaft of Dorr thickener 47. 50 is the overflow launder on 47.

51 is a pipe nipple which fixes 50 to valve 52. 53 is a pipe nipple which fixes 52 to 54 the suction elbow on centrifugal pump 55. 56 is a pipe which fixes the discharge of 55 to elbow 57. 58 is a pipe nipple which fixes 57 to elbow 59. 60 is a piece of pipe fixed to 59 and faces down into tank 41.

61 is the discharge cone fixed to the bottom of Dorr thickener 47. 62 is an elbow fixed to 61. 63 is a pipe nipple which fixes 62 to valve 64. 65 is a pipe nipple which fixes 64 to elbow 66. 67 is a piece of pipe fixed to 66 and faces down into agitator 68.

The agitator 68 is broken away, showing the propeller 69 therein, fixed to drive shaft 70. 71 is a pipe nipple which fixes 68 to valve 72. 73 is a pipe nipple which fixes 72 to 74 an elbow facing down. 75 is a piece of pipe fixed to 74 and faces down into 76 the fountain of a coating machine; the fountain as shown, being an elevation in section, the section being taken along the approximate center of the fountain. 77 is the fountain roller and 78 is the ink roller. See books and manufacturers' catalogues on coating machines, newspaper printing presses, etc., as to the means employed for rolling a film of paint, lacquer, ink, etc., on sheets of tin plate, newspaper paper, etc., and other moving surfaces.

79 is the electrolyte tank, the same being an elevation in section, the section being taken along the approximate center of the tank.

80 is a motor-generator set; such as is used in electro-chemical plants for producing six volts, direct-current electricity; as can be understood other sources of direct-current electricity are applicable in the present invention.

81 is a conductor, leading from 80 to 82 a carbon-or-other-conducting-material brush, which makes contact with collector ring 83, which is fixed to cathode shaft 84.

85 is the cathode, and it is drum shaped, or an elongated cylinder with the ends thereof closed in; and is fixed to shaft 84, and revolves therewith. The bearings, which support 84, and wherein 84 revolves are not shown in the drawing. The cathode revolves in the direction of the arrow.

The outer surface of the cathode is divided into twenty-four (24) sections. These sections are composed of carbon or graphite, or mixtures of carbon and graphite.

86 is an electrical conductor leading from 80 to 87 the anode. The dotted line A—A represents the height of the electrolyte in the electrolyte tank.

88 is a baffle parallel axially with the cathode; the length of 88, being longer than the cylindrical surface of 85. 88 is fixed on the top of the electrolyte tank; and is adjusted to about 0.0625 inch from the surface of the cathode.

89 is a spray, which sprays oil on the cathodic surface.

90 is a scraper which rests on the cathodic surface, and is slightly longer than the cathodic surface. The shaded portion 91 is composed of neoprene, or other synthetic oil-resistant rubbers; or other soft oil-resistant material.

92 is a launder, which is somewhat longer than scraper 90; the ends of 92 approximately coincide longitudinally with the ends of 90. 93 is a pipe which fixes 92 to 94 a valve. 95 is a pipe nipple which fixes 94 to 96 a centrifugal separator.

97 is a pipe nipple which fixes 96 to 98 a valve. 99 is a pipe nipple which fixes 98 to 100 an elbow. 101 is a pipe which fixes 100 to 102 a centrifugal separator. 103 is a pipe nipple which fixes 102 to 104 an elbow. 105 is a pipe nipple which fixes 104 to 106 a valve. 107 is a pipe nipple which fixes 106 to 108 the suction elbow fixed to 109 a centrifugal pump. 110 is a pipe nipple which fixes the discharge of 109 to 111 a valve. 112 is a pipe which fixes 111 to 113 an elbow. 114 is a pipe nipple which fixes 113 to 115 an elbow. 116 is a pipe which fixes 117 a T to 115. 118 is a pipe which fixes 117 to 119 an elbow. 120 is a pipe which fixes 119 to 121 a valve. 122 is a pipe nipple which fixes 121 to tank 41.

123 is a pipe nipple which fixes 117 to 124 a valve. 125 is a pipe nipple which fixes 124 to 126, a forty-five degree, elbow. Spray 89 is fixed to 126.

127 is a pipe nipple which fixes 102 to 128 a valve. 129 is a pipe nipple which fixes 128 to 130 the suction elbow on centrifugal pump 131. 132 is a pipe which fixes 131 to elbow 133. 134 is a nipple which fixes 133 to 135 an elbow facing down. 136 is a piece of pipe fixed to 135 and faces down into electrolyte tank 79.

137 is a pipe nipple which fixes 96 to valve 138. 139 is a pipe which fixes 138 to 140 a gas-tight tank; tank 140, being filled with an inert gas, during the operation of the present invention.

141 is a pipe nipple which fixes 140 to 142 a valve. 143 is a pipe nipple which fixes 142 to 144 an elbow. 145 is a pipe which fixes 144 to 146 the top member of an amalgam press.

147 is the barrel of the amalgam press and is an elongated cylinder; and is defined by the dotted lines B—B. 148 is the base of the press and is defined by the lower dotted line B—B and E—E. 147 is fixed to 146 and 148 by suitable means. 149 are three fine holes drilled vertically through base 148; the diameters thereof, being about 0.016 inch. 150 is several layers of heavy tightly woven canvas of about 15 ounce weight per square yard; which is first cut round, and slightly larger in diameter than barrel 147 of the amalgam press; thereafter the layers of canvas are forcibly packed in the bottom of the barrel, as shown and defined by numeral 150.

Upon 150 a layer of fine crushed quartz or silicon dioxide particles of about 150 to 250 mesh-screen size is formed; said layer of silicon dioxide particles, being from about 0.500 inch to 1.00 inch in thickness, and is designated by the numeral 151.

Upon 151 another layer of fine crushed quartz or silicon particles, the particles being approximately from about 0.0005 inch to 0.0001 inch in diameter, is formed; said layer of silicon dioxide, being from about 0.500 inch to 1.00 inch in thickness, and is designated by the numeral 152.

In the above procedure, wherein various layers of different sized particles are formed one upon another in the bottom of the amalgam press is called making a sand or quartz filter; and is an old art. See books on colloidal chemistry and industrial colloidal chemistry, as to the construction of pressure filters for filtering colloidal solids from liquids.

Soft or pasty amalgam is one of the finest filtering mediums known; i.e., only particles approaching the atom in diameter will flow through a layer of soft or pasty amalgam. See books on the manufacture of dental amalgams; likewise, see books on the amalgamation of gold ores; as to the various kinds of amalgams, such as soft or pasty amalgams and hard amalgams.

Additionally, see the following book: "Chemical Society of London Journal, 1932, vol. 135, part 1, page 891": for the following article: "The Solubilities of Copper, Manganese, and Some Sparingly Soluble Metals in Mercury." See page 892 lines 19 to 21 for the following quotation: "In all experiments on which reliance was placed, the base of the filter was completely covered with this paste and the filtrate passed through at least three times."

In the present invention there are two products formed between the mercury and the cations, during electrolytic action on the cathodic surface; and they are as follows:

First, most of the cations unite with the mercury to form amalgams, with varying formulas; such as $Hg_5 Cu_8$, $Hg_7 Cu_4$, etc.

See "Comprehensive Treatise on Chemistry" by William Mellor, under each chemical element, as to the amalgams they form; and, likewise, the formulas of their amalgams. As can be seen in the above, amalgams have large molecules.

Second, there is a very small amount, and with some chemical elements, the amount is insignificantly small; of metal in the atomic state or near-atomic state, that goes into solution in the mercury.

This invention is only concerned with the first product or the amalgams in most elements, as far as producing metals is concerned by using the present invention. Especially, the first product or amalgams of those elements, which are sparingly soluble in mercury; i.e., the following elements manganese, titanium, vanadium, chromium, iron, cobalt, nickel, zirconium, columbium, molybdenum, hafnium, tantalum, tungsten, etc., being sparingly soluble in mercury.

Consequently, it is necessary to separate the first and second products from each other, by using an amalgam pressure filter press; otherwise, it would be necessary to distill all the mercury employed, as a mercury cathode, to separate the deposited metal on the mercury cathode from the mercury. And to distill all the mercury employed, as a mercury cathode, would be a rather slow and expensive step in the present invention.

With elements such as iron, cobalt, etc., which are magnetic, and can be separated by a magnetic separator from mercury; a magnetic separator may be employed to separate them from the mercury, without employing the distillation of mercury; consequently, the amalgam pressure filter, may or may not be employed with iron, cobalt, etc.

Upon 152 a layer of soft or pasty amalgam is formed; said layer of amalgam is formed upon 152, and between the dotted lines C and D; and is designated by the numeral 153. The top of the soft or pasty amalgam coincides with the bottom of an orifice shown, passing through the side of barrel 147, and numbered 154. 155 is a boss fixed to the side of 147, wherethrough the orifice passes.

156 is a pipe nipple which fixes 155 to 157 a valve. 158 is a pipe nipple which fixes 157 to 159 a retort, suitable for distilling mercury from an amalgam. 160 is the base of the retort, whereupon the top of the retort 161 is fixed by yoke 162. 163 is a wedge which tightens the yoke. See manufacturers' catalogues on retorts, suitable for distilling mercury from an amalgam, as to the construction of the retort and its operations; distilling mercury from an amalgam is an old art.

164 is a pipe nipple which fixes 161 to 165 an angle elbow. 166 is a condenser, wherethrough pipe 167 passes; 167 is fixed to 165. Cooling water surrounds pipe 167 in 166. 168 is a broken-off pipe, which leads to a source of cooling water. Cooling water is admitted to within 166 through 168. 169 is a broken-off pipe, wherethrough warm water from within 166 is carried off for disposal.

170 is a T fixed to 167. 171 is a broken-off pipe which leads to a receiver, suitable for storing a mixture of ammonia gas ($NH_3$) and hydrogen gas, or other gas.

172 is a gooseneck, which fixes 170 to 173 a valve. 174 is a pipe nipple, which fixes 173 to 175 a T.

176 is a vessel fixed to 148. 177 is a pipe nipple which fixes 176 to elbow 178. 179 is a pipe nipple which fixes 178 to 180 a valve. 181 is a pipe which fixes 180 to 175 a T. 182 is a pipe nipple which fixes 175 to 183 an elbow. 184 is a pipe nipple which fixes 183 to 185 a gear pump.

186 is a pipe nipple which fixes 185 to 187 an elbow. 188 is a pipe nipple which fixes 187 to 189 an elbow. 190 is a pipe nipple which fixes 189 to 191 a valve. 192 is a pipe which fixes 191 to 193 an elbow. 194 is a pipe nipple which fixes 193 to 195 an elbow facing down into tank 1. 196 is a piece of pipe fixed to 195 and facing down into tank 1.

Figure 2:
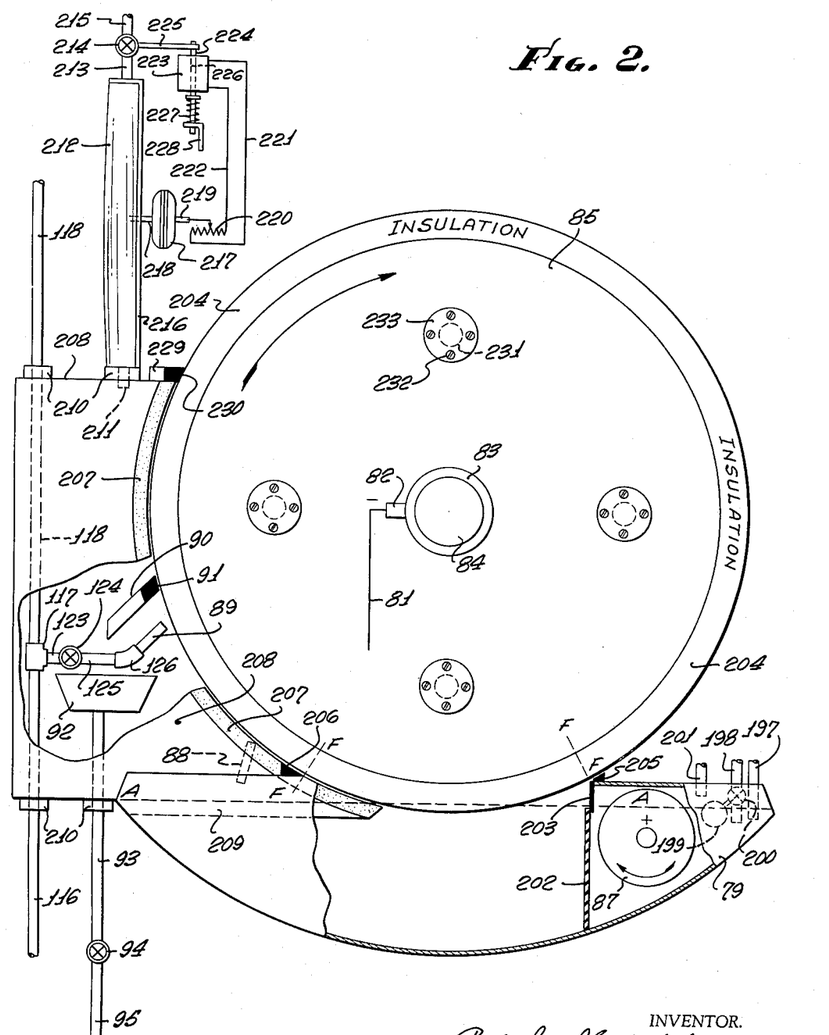
FIGURE 2 is a partial diagrammatic flow sheet, illustrating modifications in the flow sheet in my invention.

Referring to FIGURE 2. In FIGURES 1 and 2 like parts have the same numeral. Consequently, see the description of the parts in FIGURE 1, as to the identity of like parts in FIGURE 2.

In FIGURE 2 broken-off pipe 197 leads to a degasifier; the degasifier is not shown; see books on industrial chemistry, steam-electric plants, as to degasifiers and deaerators, as to their construction and function. Likewise, see books on the cyanide process, for treating gold and silver ores, as to the Crowe-vacuum process, used therein. Degasifiers, deaerators and the Crowe-vacuum process all relate to removing an entrained gas or gases from electrolytes and solutions.

There is a float and valve located near the bottom of 197 within the electrolyte tank 79; this float and valve are not shown in FIGURE 2; see books and articles, wherein descriptions of floats and valves are given; floats for regulating valves are old in the arts.

198 is a broken-off pipe, and is the return pipe from the degasifier. There is a float 199, which regulates valve 200; both, being located within the electrolyte tank 79.

201 is a broken-off pipe which leads to a compressor suitable for compressing gases. There is an atmospheric diaphragm not shown, and a valve with a variable orifice; the same must be used; because atmospheric pressure must be maintained in the right-hand side of the electrolyte tank 79, as hereinafter described; see books and articles on steam-electric plants and water-turbine plants, in regards to valves with variable orifices, and their uses in maintaining, such plants at 60, 50, etc., cycle electricity. Valves with variable orifices are old in the arts.

202 is a porous diaphragm, and maybe composed of asbestos, fiber glass, canvas, etc.; see books on electrochemistry, as to the various substances, that have been used as porous diaphragms in aqueous electrolytic cells. Porous diaphragms in aqueous electrolytic cells are old in the arts.

202 is fixed to 203; 203, being a solid member, which extends across the electrolyte tank; being fixed to both sides, and the top of electrolyte tank 79 in a gas-tight manner. 203 extends below the electrolyte line A—A. 203 is composed of an acid or alkaline resistant material.

204 is insulating material fixed to the end of cathode 85 as shown; there is like insulating material on the opposite end of the cathode. The insulating material extends onto the cylindrical surface on both ends of the cathode approximately two inches; the insulating material and its location of about two inches on the cylindrical surface is not shown in the drawing. The insulating material may be composed of lacquer, acid or alkaline resistant paints, etc.; see books and articles on aqueous electrochemical processes, in regards to the insulating materials, which have been used in aqueous electrolytic processes, to insulate parts of cathodes or anodes, whereon electrolytic deposits are not desired.

205 is a strip of rubber, such as neoprene, or other similar oil-resistant rubber. It is slightly longer than the cylindrical-longitudinal surface of the drum; and it is located about 0.0625 inch from the surface of the cathode. Its function is to keep dust and atmospheric gases from entering the electrolyte. Likewise, it prevents chlorine gas from leaving the electrolyte; provided, a chloride of a salt, is used as the electrolyte.

Between dotted lines F—F, there is a rubber packing strip made preferably of neoprene sponge rubber, or other oil-resistant rubber. The packing strip is attached to the side of the electrolyte tank, and extends from member 203 to the left-hand-dotted F—F line. Its function is to keep dust and atmospheric gases from entering the electrolyte; additionally, it prevents chlorine gas from leaving the electrolyte, provided a chloride of a salt is used as the electrolyte. There is a like packing strip on the opposite end of the electrolyte tank.

206 is a short rubber strip, which extends from the edge of the electrolyte tank to packing strip 207; it is made of neoprene; or other similar oil-resistant rubber. There is a like strip of rubber on the other end of the electrolyte tank.

207 is a packing strip composed of nylon, vinyl plastic, etc., or other plastics; additionally, neoprene rubber or other oil-resistant rubbers may be employed. It is preferably that the packing strip 207, previously be molded to fit the circumference of cathode 85; before being employed as a packing strip. Packing strip 207 rests on the insulated strip on the circumference of the cathode. The packing strip is fixed to gas-tight-metal housing 208; and extends below the electrolyte line A—A. 209 is a skirt, which is fixed to the inside of the electrolyte tank and extends below the electrolyte line A—A; 209 is composed of acid or alkaline-resistant material and supports the end of 207. There is a like packing strip 207 on the other end of the cathode.

210 are gas-tight packing glands, which furnish gas-tight joints wherethrough pipes 116, 93, 118 and 211 pass through the gas-tight housing 208; 211 is a short piece of pipe, which leads from the inside of 208 to within atmospheric regulating bag 212.

213 is a pipe which leads from within 212 to variable orifice valve 214. 215 is a broken-off pipe which leads from 214 to a compressor suitable for compressing gases. 216 is a metal wall, whereto 212 is fixed, the same being a gas-tight joint.

217 is an atmospheric diaphragm. 218 is a small pipe that leads from within 212 to within 217. 219 is a rod which is actuated by the diaphragm; 219 actuates adjustable or variable resistance 220.

221 and 222 are electrical conductors, which lead from 220 to 223 a solenoid. 224 is a rod fixed to plunger 226 in the solenoid; and, likewise, fixed to the end of lever 225 with a yoke and pin, or other flexible means. Lever 225 is fixed on the left-hand end to 214. 227 is a spring, and 228 is a bracket.

229 is a metal member fixed to the top of housing 208; 229 is about the axial length of the cathodic surface. 230 is a packing strip composed of neoprene sponge rubber or other oil-resistant rubber. The purpose of 230 is to prevent gases, from escaping from the top right-hand side of 208, where 208 and the cathode coincide.

231 are hand holes in 85 and are covered by plates 233; 233 being fixed to 85 by counter-sunk-head screws 232. The purpose of 231 is to furnish holes; wherethrough a workman can fix the carbon or graphite blocks on the metal surface of 85.

Having described the apparatus I will now illustrate the use of the present invention with numerous examples, using mercury conductive particles; as well as other conductive particles.

Referring to FIGURE 1. Tank 1 is filled with mercury, and tank 41 is filled with asphaltic-base lubricating oil of approximately 30 S.A.E. viscosity, or some other oleaginous material of similar viscosity. I prefer to use asphaltic-base lubricating oils on account of their cheapness. Cone classifier 9 and Dorr thickener 47 are, likewise, filled with said above oil.

Mercury flows from tank 1, then through 2, 3, 4, 5 and 6 to within rotor housing 7. Rotor 8 revolves in the direction of the arrow; the peripheral speed, being approximately 10,000 feet per minute. When the stream of mercury, being discharged from 6, strikes the revolving rotor; the mercury is dispersed into small particles of mercury.

A stream of oil flows from 41, then through 40, 39, 38, 32, 33, 34, 35, 36 and enters the inside of rotor housing through 37; thus the inside of rotor housing 7 is flooded with oil; and the above dispersed small particles of mercury are coated with oil.

A mixture, of mercury particles and oil, flows through the cone-shaped discharge of the rotor housing into the center of 9. A stream of oil under pressure flows from the end of 11; and causes an upward current of oil in the center of 9; the stream of oil, being supplied to 11, through 31, 30, 29, 28, 27 and 10; the pressure of the oil being regulated by valve 28.

The mercury conductive particles, of about 0.001 inch in diameter and suitable for use in the present invention, are swept over the edge of the cone classifier into the overflow launder 12; see books on hydraulic classification, as to cone classifiers and their operation.

The mercury particles; somewhat larger in diameter than 0.001 inch and not suitable for use as mercury conductive particles in the present invention; gravitate to the bottom of cone classifier 9; and then through 13, 14, 15, 16, 17, 18, 19 and 20 into 21; and from 21, through 22, 23, 24, 25 and 26 into tank 1. Thus, the particles of mercury, which are too large for use in the present invention, are returned to tank 1 for reuse.

The mercury conductive particles; of about 0.001 inch in diameter and suitable for use in the present invention; are conveyed by the oil, wherein they are dispersed, from overflow launder 12, then through 42, 43, 44, 45 and are discharged from the end of 46 into Dorr thickener 47.

The mercury conductive particles settle to the bottom of the Dorr thickener, and are conveyed by the revolving rakes 48 into conical discharge 61. See books on hydraulic classification as to Dorr thickeners and their operation.

In Dorr thickener 47 the oil, wherefrom the mercury conductive particles has settled, flows into overflow launder 50; and therefrom through 51, 52, 53, 54 into centrifugal pump 55; and therefrom through 56, 57, 58, 59 and is discharged from 60 into tank 41.

A mixture; of mercury conductive particles and oil, of about the following percentages, about 8 percent oil by weight and 92 percent mercury conductive particles by weight; flows from 61, and then through 62, 63, 64, 65, 66 and from 67 into agitator 68.

The rotating propeller 69 prevents the mercury conductive particles from settling in the oil in agitator 68. From 68 the mixture, of mercury conductive particles and oil, flows through 71, 72, 73, 74 and 75 into 76.

The fountain roller 77 transfers, a film composed of mercury conductive particles and oil, to the surface of ink roller 78; and 78 transfers, a film composed of mercury conductive particles and oil, to the surface of cathode 85. 77, 78 and 85 rotate in the direction of the arrows and at the same peripheral speed.

I will now illustrate by example, the production of finely-divided metals suitable for paint pigments, etc., by use of the present invention; the finely-divided metals being copper, silver, gold, etc.

First, electrolyte tank 79 is filled with an electrolyte of about the following composition; about 10 ounces per gallon of copper sulphate ($CuSO_4 \cdot 5H_2O$) and about 12 ounces per gallon of sulphuric acid ($H_2SO_4$). The current density per square foot of cathode surface, being about 200 amperes; and the current density per square foot on the anode being about 95 amperes. The voltage is about six volts. The temperature of the electrolyte being about 120 degrees Fahrenheit. Air agitation, or other means of agitation, of the electrolyte is employed. The peripheral speed of the cathode surface is so adjusted, that electrolytic action on the cathodic surface is about one minute or less; or the time of electrolysis is about one minute or less. In the present invention electrolytic action on the cathodic surface can vary from about one minute to less than one-three-hundredths ($\frac{1}{300}$) of a second; i.e., whenever finely-divided metal particles with large diameters are desired as the product, the cathode rotates slowly, and whenever finely-divided metal particles with small diameters are desired as the product, the cathode rotates very fast. In the present invention I may rotate the cathode, so that the time of electrolysis may vary on the cathodic surface from about one minute to one-three-hundredths ($\frac{1}{300}$) of a second. It is old in the arts to vary the speed of rotating cathodes; in order to vary the amount of metal deposited on the cathodic surface.

In the various examples in the present invention I may produce finely-divided metals, from about 0.0015 inch in diameter to about 0.00000015 inch in diameter; and I produce said different sized finely-divided metals by varying the time of electrolysis on the cathodic surface. In addition to varying the speed of rotating the cathode; I may vary the submergence of the cathode in the electrolyte; i.e., see FIGURES 1 and 2 for electrolyte line A—A; as can be readily understood, by raising or lowering the height of electrolyte line A—A in tank 79, I can vary the time of electrolysis.

See FIGURES 1 and 2 in the present invention for anode 87. In the present example anode 87 may be a bar or plate of electrolytic copper, or other source of copper, of about the axial length of cathode 85. In the present example the anode is preferably located about centrally in tank 79, and is stationary.

In the following examples, wherein copper, silver, gold, etc., finely-divided metals are produced, the diaphragm 202 is not used; and additionally, 203, 201, 200, 199, 198 and 197 are not used in these examples. Furthermore, gas-tight housing 208 is not employed in these example. In these examples of producing finely-divided copper, silver, gold, etc., appreciable amounts of gases are not produced on the cathode or anode.

Throughout the description of the present invention, wherever examples are shown, wherein appreciable amounts of gases are produced on either the cathode or the anode; and the means shown in FIGURE 2 for recovering these gases is employed, the same will be stated in the example.

In the following paragraphs the series of events, which cause the process to function as the cathode rotates, will be described.

First, ink roller 78 transfers, a film of oil and mercury conductive particles, of about the following weights per square foot of cathode surface; about twenty (20) grams to about four (4) grams per square foot of cathode surface, depending upon how fast the cathode rotates; i.e., when the cathode rotates so the time of electrolysis is about one minute, about twenty (20) grams of mercury conductive particles are used per square foot of cathode surface; and whenever, the cathode rotates so the time of electrolysis is about one-three-hundredths ($\frac{1}{300}$) of a second, about four (4) grams of mercury conductive particles are used per square foot of cathode surface.

Next, the oil-filmed surface of the rotating cathode, containing the mercury conductive particles, rotates until it is submerged in the electrolyte, whereupon electrolytic action takes place between the copper cations and the mercury conductive particles in the oil film, and an amalgam of copper is formed.

Then, the section of the rotating cathode, containing the copper amalgam; rotates past baffle 88 and any large drops of electrolyte, adhering to the surface of the cathode are removed from the cathodic surface by striking baffle 88. The drops of electrolyte, removed by baffle 88, drip from the bottom of 88 and enter the electrolyte tank.

Next, the section of the rotating cathode, containing the copper amalgam; rotates to spray 89; and spray 89 sprays oil on the rotating cathode.

Then, the section of the rotating cathode, containing the copper amalgam; rotates to scraper 90; and scraper 90 scrapes the mixture of oil, copper amalgam and small amounts of electrolyte from the cathodic surface.

Next, the section of the cathode, wherefrom the copper amalgam, etc., was scraped, rotates to ink roller 78, and 78 transfers, a film of oil and mercury conductive particles, to the surface of the cathode.

The above series of operations is repeated on each section of the cathodic surface, as the cathode rotates.

The oil, which spray 89 uses flows from tank 41, then through 122, 121, 120, 119, 118, 117, 123, 124, 125, 126 to spray 89; valve 124 regulates the pressure of the oil.

Only one spray 89, and only one scraper 90 are shown in the figures; several sprays 89 and several scrapers 90 may be employed.

The mixture, of oil, copper amalgam and a small percentage of electrolyte, flows from the bottom of scraper 90 into launder 92; from 92 the above mixture, flows through 93, 94, 95, into centrifugal separator 96.

In 96 the copper amalgam is separated from the oil and electrolyte. The copper amalgam is discharged from 96 into 137.

The mixture of oil and electrolyte is discharged from 96 into 97; and from 97, then through 98, 99, 100 and from 101 into centrifugal separator 102.

In 102 the electrolyte is separated from the oil.

The separated electrolyte is discharged from 102 into 127; and from 127, then through 128, 129, 130 into centrifugal pump 131; and from 131 then through 132, 133, 134, 135 and from 136 the separated electrolyte is returned to the electrolyte tank 79.

The separated oil is discharged from 102 into 103; and from 103 then through 104, 105, 106, 107 and from 108 into centrifugal pump 109; and from 109 then through 110, 111, 112, 113, 114, 115, 116, 117, 118, 119, 120, 121, 122 and, then from 122 into tank 41.

The separated copper amalgam flows from 137 through 138, 139 into tank 140 which is filled with an inert gas; the inert gas being supplied through pipe 140'. The copper amalgam flows from 140 into 141, and then through 142, 143, 144 and 145 then through an orifice in 146 into 147 the barrel of the pressure filter.

When the barrel 147 is filled with copper amalgam, valve 142 is closed. Then inert gas under high pressure is admitted to the inside of barrel 147 through pipe 146'.

When the high-pressure inert gas exerts pressure on the top of the copper amalgam inside of 147; the excess mercury in the copper amalgam flows through the various layers of filtering mediums; and then through holes 149 into vessel 176. I only show three holes 149 in the base 148 of the pressure filter in FIGURE 1, but in the base 148 there are a great many of these drilled holes 149.

The filtered mercury leaves vessel 176, then through 177, 178, 179, 180, 181, 175, 182, 183, 184 into gear pump 185; and from 185 then through 186, 187, 188, 189, 190, 191, 192, 193, 194, 195 and from 196 into tank 1. Thus, the filtered mercury is returned to tank 1 for reuse in the process. It is to be understood, there is a very small amount of copper, in a very fine state of subdivision, in solution in the filtered mercury returned to tank 1.

When the excess mercury has been filtered from the copper amalgam in 147; crystals of copper amalgam of about the following formulas $Hg_5Cu_8$, $Hg_7Cu_4$, etc., remain in 147; and the pressure of the inert gas is so adjusted, that the copper crystals in 147 are in a pasty or soft amalgam state.

After the filtering in 147 has been completed, the inert gas is shut off; and then, valve 157 is opened.

Next, the inert gas is again admitted to within barrel 147; and the soft or pasty amalgam is forced through orifice 154, then through 155, 156, 157, 158 and from 158 into retort 159.

The pressure of the inert gas is just sufficient to force the soft or pasty copper amalgam from 147 into retort 159; the excess of inert gas passes from retort 159; then through 164, 165, 167, 170, and from 170 into broken-off pipe 171, and from 171 into a receiver suitable for storing an inert gas.

Broken-off pipe 171 may, likewise, lead to a compressor suitable for compressing a mixture of ammonia gas $NH_3$ and hydrogen gas. Whenever the ammonium cation is used, as part of an electrolyte, some of the ammonium cations unite with the mercury to form ammonium amalgam. In the retort even at a comparatively low temperature of about 100 degrees centigrade; the ammonium amalgam breaks down into ammonia $NH_3$ gas and hydrogen gas. So wherever practical, the ammonium cation should be used in the electrolyte in the present invention, instead of, calcium, magnesium, sodium, potassium, etc., cations. The calcium cation and other cations with high distillation temperatures should be avoided in the electrolytes in the present invention; the ammonium cation should be used instead.

When the inert gas has forced the pasty or soft amalgam from barrel 147; the supply of inert gas is shut off, and valve 157 is closed; and the pressure filter is now ready to be filled with copper amalgam from tank 140.

Next, sufficient heat is applied to retort 159, which contains the copper amalgam; to distill the mercury from the copper particles in 159. A retort temperature of about 800 to about 1000 degrees Fahrenheit, being sufficient to distill the mercury.

The mercury in a gaseous state is discharged from 159 into 164; and from 164 into 167. In 167 the gaseous mercury is condensed to the liquid state; and from 167 the mercury flows through 170 into gooseneck 172; 172 acting as a seal or trap prevents gases from passing into 173. From 172 the mercury flows through 173; and from 173 through 174 into 175, wherein the mercury joins the flow of mercury from the pressure filter, and is returned to tank 1 with the same.

Next, wedge 163 is removed by driving on the same. Then yoke 162 is removed; and the base of the retort 160 is removed. The finely-divided copper, the product produced in the present example, is removed from 160.

Then the retort is assembled, and is now ready for another charge of copper amalgam.

Example Number 2; wherein finely-divided silver is produced. In this example I employ an electrolyte of about the following composition; sulphuric acid $H_2SO_4$ of about 1.40 specific gravity and silver sulphate $Ag_2SO_4$ about 4 ounces per gallon. A current density of about 100 to about 150 amperes per square foot of cathode surface is employed. An E.M.F. of about six volts is used. An electrolyte temperature of about 110 degrees Fahrenheit is employed. An anode composed of silver, platinum, or other substance suitable for use as an anode in a sulphuric acid electrolyte, is employed.

Example Number 3, where in finely-divided gold is produced. I use an electrolyte of about the following composition; about 2 to about 4 troy ounces per gallon of gold, as "chlorauric acid" $AuCl_3.HCl.4H_2O$. A current density of about 75 to about 100 amperes per square foot of cathode surface is employed. An E.M.F.

of about six volts is employed. An electrolyte temperature of about 125 degrees Fahrenheit is used. An anode composed of gold is employed.

In the next three examples, finely-divided iron, cobalt and nickel are produced; they were grouped for the reason the finely-divided iron, cobalt and nickel are magnetic.

Example Number 4; wherein finely-divided iron is produced. In this example I use an electrolyte of about the following composition; ferrous ammonium sulphate $FeSO_4(NH_4)_2SO_4.6H_2O$ about 48 ounces per gallon, and free sulphuric acid $H_2SO_4$ about 0.03 ounce per gallon. A current density of about 150 to about 200 amperes per square foot of cathode surface is employed; and an E.M.F. of about six volts is used. An electrolyte temperature of about 110 degrees Fahrenheit is used. An iron anode of wrought iron is employed; or I may use other sources of iron in the electrolyte; i.e., see books on electrochemistry, as to the various methods of supplying iron to electrolytes, in electrolytic processes wherein iron is precipitated electrolytically on cathodes.

Example Number 5; wherein finely-divided cobalt is produced. In this example I use an electrolyte of about the following composition; cobalt ammonium sulphate $CoSO_4.(NH_4)_2SO_4.6H_2O$ about 30 ounces per gallon. A current density of about 150 to about 200 amperes per square foot of cathode surface is employed. An E.M.F. of about six volts is used. An electrolyte temperature of about 105 degrees Fahrenheit is used. An anode of cobalt is employed.

Example Number 6; wherein finely-divided nickel is produced. In this example I use an electrolyte of about the following composition; nickel sulphate $NiSO_4.6H_2O$ about 32 ounces per gallon, nickel chloride $NiCl_2.6H_2O$ about 6 ounces per gallon and boric acid, $H_3BO_3$ about 4 ounces per gallon. A current density of about 150 to about 200 amperes per square foot of cathode surface is employed. An E.M.F. of about six volts is used. An electrolyte temperature of about 115 degrees Fahrenheit is used. An anode of nickel is employed.

In the following examples the chemical elements such as titanium, vanadium, chromium, molybdenum, columbium, tungsten, tantalum, etc., i.e., chemical elements which only unite with mercury in the -ous state to make amalgams, were grouped. In the following examples high current density must be employed, consequently, large amounts of gases are produced on the cathode during electrolytic action; and in some examples large amounts of gases are produced on both the cathode and the anode during electrolytic action; consequently, the gas saving apparatus shown in FIGURE 2; see the following apparatus and numerals in FIGURE 2, gas-tight housing 208, diaphragm 202, etc., are employed to save the gases produced on the cathode and anode. Additionally, a catholyte and an anolyte must be employed.

In the following examples, I find it advantageous to pre-reduce the catholyte in a separate electroylte tank, containing a cathode and an anode; the cathode and anode, being separated by a porous diaphragm. It is old in the art of electrochemistry, to pre-reduce a catholyte to the -ous state before using the catholyte in an electrolyte tank wherein cations are precipitated on a cathode; i.e., quoting from the following book: "Principles of Electroplating and Electroforming by William Blum and George B. Hogaboom, third edition, copyright 1949, page 348. Under Molybdenum Deposition the second paragraph thereunder, the following quotation: 'this solution was first reduced electrolytically by passing 1,600 amp-hr through 1 l. of solution between platinum electrodes'." The above quotation is evidence that it is old in the arts to pre-reduce a catholyte, before using the catholyte in the electrolytic tank, wherein cations are precipitated from the catholyte onto a cathode.

Example Number 7; wherein finely-divided molybdenum is produced. In this example I use a catholyte of about the following composition about 400 grams of molybdenum trioxide $MoO_3$ per liter and sulphuric acid $H_2SO_4$ of about 1.45 specific gravity, the catholyte to be pre-reduced at about 1,600 to about 2,000 amperes per square foot of cathode surface. An anolyte of about 4 normal sulphuric $H_2SO_4$ is employed. A current density of about 350 to about 400 amperes per square foot of cathode surface is employed. An E.M.F. of about 6 volts is used. An electrolyte temperature of about 150 degrees Fahrenheit is employed. A revolving anode composed of platinum; or a revolving anode composed of other substances suitable for use as an anode, in an anolyte composed of sulphuric acid $H_2SO_4$; is employed. See FIGURE 2; in this example large amounts of hydrogen are produced on the cathode and large amounts of oxygen are produced on the anode, consequently, gas-tight housing 208, the porous diaphragm 202, etc., are employed to save these gases.

Example Number 8; wherein finely-divided chromium is produced. In this example I use a catholyte of about the following composition; about 50 ounces per gallon of chromic acid $CrO_3$ and 0.50 ounce per gallon of sulphate radical $SO_4$, the catholyte to be pre-reduced. An anolyte of about 4 normal sulphuric acid is employed. A current density of about 350 to about 400 amperes per square foot of cathode surface is employed. An E.M.F. of about 6 volts is used. An electrolyte temperature of about 140 degrees Fahrenheit is employed. A revolving anode composed of platinum, or other substance suitable for a sulphuric acid $H_2SO_4$ anolyte, is used. Since large amounts of gases are produced on the cathode and anode, the gas-saving apparatus shown in FIGURE 2 is employed in this example.

Example Number 9; wherein finely-divided vanadium is produced. In this example I use a catholyte of about the following composition; a solution of about 15% sodium vanadate $Na_2VaO_4$ dissolved in 2 normal sulphuric acid $H_2SO_4$; the catholyte to be pre-reduced. An anolyte of about 4 normal sulphuric acid $H_2SO_4$ is employed. A current density of about 350 to about 400 amperes per square foot of cathode surface is employed. An E.M.F. of about 6 volts is used. An electrolyte temperature of about 160 degrees Fahrenheit is employed. A revolving anode composed of platinum; or a revolving anode composed of other substances, suitable for use as an anode in an anolyte composed of sulphuric acid $H_2SO_4$; is employed. Since large amounts of gases are produced on the cathode and anode, the gas saving apparatus shown in FIGURE 2 is employed in this example.

The following quotation is a part of the specification; see FIGURE 1 for the construction of the cathodic surface: "The outer surface of the cathode is divided into twenty-four (24) sections. These sections are composed of carbon or graphite, or mixtures of carbon and graphite." As can be readily understood the outer surface of the cathode can be divided into other than twenty-four (24) sections. In the claims I will refer to the outer surface of the cathode as being carbonaceous; and by the word (carbonaceous) I mean the outer surface of the cathode, can be composed of carbon or graphite, or mixtures of carbon and graphite.

Referring to FIGURE 1; wherein numerals 151 and 152 denote fine silicon dioxide or quartz particles. As can be understood, I may employ fine particles composed of pyrite, carbon, graphite, metal, etc., substances which mercury wets readily, instead of silicon dioxide or quartz particles.

Referring to FIGURE 2; see gas-tight housing 208. As can be readily understood gas-tight housing 208 could be employed to prevent oxidation, when finely-divided metals are produced in the present invention; i. e., some finely-divided metals, which are produced in the present invention oxidize readily; such as copper, iron, etc. However, provided gas-tight housing 208 is filled with an inert gas; oxygen is thereby, excluded; and the finely-divided metal is not subject to oxidation. As can be readily understood, gas-tight housing 208, can be employed for two useful purposes in the present invention; firstly, to recover gases formed on the rotating cathode; or, secondly, to prevent oxidation of the finely-divided metals formed on the rotating cathode.

Between pipe 201 and the compressor; which compresses the gases formed in the anode compartment, whenever an anolyte is used, and appreciable amounts of gases are formed on the anode; there is located a variable orifice valve which is the same in construction as variable orifice valve 214.

See FIGURE 1; for ink roller 78. As can be readily understood; other means can be employed, for forming a film, composed of a mixture of an oleaginous vehicle and mercury conductive particles on a rotating cathodic surface, other than an ink roller; i.e., a film, composed of a mixture of an oleaginous vehicle and mercury conductive particles, may be sprayed on the rotating cathodic surface, and; likewise, a series of rotating brushes might be employed to form a film, composed of a mixture of an oleaginous vehicle and mercury conductive particles on a rotating cathodic surface; and other means may be employed.

See FIGURE 1; for cathode 85 which is an elongated cylinder. As can be readily understood, I may employ disc-shaped rotating cathodes; and, likewise, employ conical-shaped ink rollers, or other means, for forming a film, composed of an oleaginous vehicle and mercury conductive particles, on said rotating disc-shaped cathodes.

As can be readily understood, a great many methods, other than that herein described, can be employed to make a mixture of an oleaginous vehicle and mercury conductive particles, suitable for use in the present invention.

A great many electrolytes, in addition to those described in the nine examples, can be employed in the present invention, in the nine examples.

Apparatus, other than that herein shown; see FIGURE 1; can be employed to separate the products removed from the cathodic surface by scraper 90; said products, being a mixture of oil, mercury conductive particles containing amalgams of the electrolytically precipitated metals and small amounts of electrolyte; i.e., see FIGURE 1, I may employ concentrating tables, cone classifiers, etc., instead of centrifugal separators 96 and 102, to separate said products.

Whenever an electromagnetic separator is employed, to separate fine iron, cobalt, nickel, etc., those finely-divided metals, produced in the present invention, which are magnetic, from mercury in the present invention; electrolytes other than those with an ammonium cation are applicable.

In the present invention, whenever finely-divided iron, cobalt, nickel, etc., those metals which are magnetic are amalgamated with the mercury conductive particles, they may be separated from the mercury by employing a Stearns Magnetic Separator which separates solids from fluids; additionally, Rowland-Wetherill high intensity magnetic separators may be employed; furthermore, other magnetic separators are applicable.

In the present invention I may employ other chemical-resistant-conducting substances; whereto mercury or mercury amalgams will not adhere, in addition to carbon or graphite, or mixtures of carbon and graphite; for the cathodic surface.

As can be understood, I may use cathodes other than an elongated cylinder or drum-shaped cathode or a disc-shaped cathode; i.e., I may use the inside of an elongated cylinder, as for illustration, a metal drum revolving on metal tires, the metal tires being fixed to the outside of the metal drum, said metal tires being supported on rollers, the apparatus, being similar to a rotary kiln used where Portland cement is manufactured. Furthermore, I may employ cathodes fixed to metal conveyors; see the metal conveyors used in automatic electroplating plants; the metal objects are cathodes in those automatic electroplating plants. Additionally, I might attach cathodes to rotating or moving plastic belts, or rotating or moving belts composed of neoprene rubber and other oil-resistant synthetic rubbers. Again, I may attach cathodes to rotating or moving belts composed of stainless steel, or similar chemical-resistant metals. As can be readily understood, a multiplicity of apparatus, employing moving cathodic surfaces, is applicable in the present invention.

Having described my invention, I declare that what I claim and desire to secure by Letters Patent is:

1. A process for producing finely-divided metals which comprises dispersing mercury in an oleaginous vehicle, forming a film composed of said oleaginous vehicle containing said dispersed mercury on a moving cathodic surface, subjecting said moving cathodic surface to electrolytic action thereby forming an amalgam, removing the oleaginous vehicle and the other products from said moving cathodic surface and separating the various products removed from said moving cathodic surface.

2. A process for producing finely-divided metals which comprises dispersing mercury in an oleaginous vehicle said dispersed mercury being about 0.001 inch in diameter, forming a film composed of said oleaginous vehicle containing said mercury of about 0.001 inch in diameter on a moving cathodic surface, subjecting said moving cathodic surface to electrolytic action thereby forming an amalgam, removing said oleaginous vehicle and the other products from said moving cathodic surface and separating said various products removed from said moving cathodic surface.

3. A process for producing finely-divided metals which comprises dispersing mercury in an oleaginous vehicle, forming a film composed of said oleaginous vehicle containing said dispersed mercury on a moving cathodic carbonaceous surface, subjecting said moving cathodic carbonaceous surface to electrolytic action thereby forming an amalgam, removing said oleaginous vehicle and the other products from said moving cathodic carbonaceous surface and separating said various products removed from said moving cathodic carbonaceous surface.

4. A process for producing finely-divided metals which comprises dispersing mercury in an oleaginous vehicle said dispersed mercury being about 0.001 inch in diameter, forming a film composed of said oleaginous vehicle containing said mercury of about 0.001 inch in diameter on a moving cathodic carbonaceous surface, subjecting said moving cathodic carbonaceous surface to electrolytic action thereby forming an amalgam, removing said oleaginous vehicle and the other products from said moving cathodic carbonaceous surface and separating said various products removed from said moving cathodic carbonaceous surface.

5. A process for producing finely-divided copper which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing copper cations thereby forming a copper amalgam, removing said oleaginous vehicle and said copper amalgam and other products from said moving cathodic surface and separating said various products removed from said moving cathodic surface thereby producing finely-divided copper.

6. A process for producing finely-divided silver which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing silver cations thereby forming a silver amalgam, removing said oleaginous vehicle and said silver amalgam and other products from said moving cathodic surface and separating said various products removed from said moving cathodic surface thereby producing finely-divided silver.

7. A process for producing finely-divided gold which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing gold cations thereby forming a gold amalgam, removing said oleaginous vehicle and said gold amalgam and other products from said moving cathodic surface and separating said various products removed from said moving cathodic surface thereby producing finely-divided gold.

8. A process for producing finely-divided nickel which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing nickel cations thereby forming a nickel amalgam, removing said oleaginous vehicle and said nickel amalgam and other products from said moving cathodic surface and separating said various products removed from said moving cathodic surface thereby producing finely-divided nickel.

9. A process for producing finely-divided cobalt which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing cobalt cations thereby forming a cobalt amalgam, removing said oleaginous vehicle and said cobalt amalgam and other products from said moving cathodic surface and separating said various products removed from said moving cathodic surface thereby producing finely-divided cobalt.

10. A process for producing finely-divided molybdenum which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing molybdenum cations thereby forming a molybdenum amalgam, removing said oleaginous vehicle and said molybdenum amalgam and other products from said moving cathodic surface and separating said various products removed from said moving cathodic surface thereby producing finely-divided molybdenum.

11. A process for producing finely-divided chromium which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing chromium cations thereby forming a chromium amalgam, removing said oleaginous vehicle and said chromium amalgam and other products from said moving cathodic surface and separating said various products removed from said moving cathodic surface thereby producing finely-divided chromium.

12. A process for producing finely-divided vanadium which comprises dispersing mercury in an oleaginous vehicle, forming a film composed of said oleaginous vehicle containing said dispersed mercury on a moving cathodic surface, subjecting said moving cathodic surface to electrolytic action in an electrolyte containing vanadium cations thereby forming a vanadium amalgam, removing said oleaginous vehicle and said vanadium amalgam and other products from said moving cathodic surface and separating said various products removed from said moving cathodic surface thereby producing finely-divided vanadium.

13. A process for producing finely-divided copper which comprises dispersing mercury in an oleaginous vehicle said dispersed mercury being about 0.001 inch in diameter, forming a film composed of said oleaginous vehicle containing said mercury particles of about 0.001 inch in diameter on a moving cathodic surface, subjecting said moving cathodic surface to electrolytic action in an electrolyte containing copper cations thereby forming a copper amalgam, removing said oleaginous vehicle said copper amalgam and the other products from said moving cathodic surface and separating said various products removed from said moving cathodic surface thereby producing finely-divided copper.

14. A process as above described in claim 13, wherein the finely-divided metal produced is silver.

15. A process as above described in claim 13, wherein the finely-divided metal produced is gold.

16. A process as above described in claim 13, wherein the finely-divided metal produced is nickel.

17. A process as above described in claim 13, wherein the finely-divided metal produced is cobalt.

18. A process as above described in claim 13, wherein the finely-divided metal produced is chromium.

19. A process for producing finely-divided iron which comprises dispersing mercury in an oleaginous vehicle, forming a film composed of said oleaginous vehicle containing said dispersed mercury on a moving cathodic surface, subjecting said moving cathodic surface to electrolytic action for less than about one minute in an electrolyte containing iron cations thereby electro-depositing iron on said mercury particles dispersed in said oleaginous vehicle, removing said oleaginous vehicle and the other products from said moving cathodic surface and separating the electro-deposited iron from the mercury by employing magnetic separation.

20. A process for producing finely-divided iron which comprises dispersing mercury in an oleaginous vehicle said dispersed mercury being about 0.001 inch in diameter, forming a film composed of said oleaginous vehicle containing said mercury of about 0.001 inch in diameter on a moving cathodic surface, subjecting said moving cathodic surface to electrolytic action for less than about one minute in an electrolyte containing iron cations thereby electro-depositing iron on said mercury particles dispersed in said oleaginous vehicle, removing said oleaginous vehicle and the other products from said moving cathodic surface and separating the electro-deposited iron from the mercury by employing magnetic separation.

21. A process for producing finely-divided iron which comprises dispersing mercury in an oleaginous vehicle, forming a film composed of said oleaginous vehicle containing said dispersed mercury on a moving cathodic carbonaceous surface, subjecting said moving cathodic carbonaceous surface to electrolytic action for less than about one minute in an electrolyte containing iron cations thereby electro-depositing iron on said mercury particles dispersed in said oleaginous vehicle, removing said oleaginous vehicle and the other products from said moving cathodic carbonaceous surface and separating the electro-deposited iron from the mercury by employing magnetic separation.

22. A process for producing finely-divided iron which comprises dispersing mercury in an oleaginous vehicle said dispersed mercury being about 0.001 inch in diameter, forming a film composed of said oleaginous vehicle containing said mercury of about 0.001 inch in diameter on a moving cathodic carbonaceous surface, subjecting said moving cathodic carbonaceous surface to electrolytic action for less than about one minute in an electrolyte containing iron cations thereby electro-depositing iron on said mercury dispersed in said oleaginous vehicle, removing said oleaginous vehicle and the other products from said moving cathodic carbonaceous surface and separating the electro-deposited iron from the mercury by employing magnetic separation.

(References on following page)

References Cited in the file of this patent

UNITED STATES PATENTS

| | | |
|---|---|---|
| 533,596 | House | Feb. 5, 1895 |
| 1,900,996 | Palmaer | Mar. 14, 1933 |
| 1,959,376 | Lucas | May 2, 1934 |
| 2,082,362 | Stevens | June 1, 1937 |
| 2,099,873 | Sternfelds | Nov. 23, 1937 |
| 2,239,144 | Dean et al. | Apr. 22, 1941 |

FOREIGN PATENTS

| | | |
|---|---|---|
| 692,922 | Germany | June 29, 1940 |

OTHER REFERENCES

Popular Science, March 1957, pages 114 and 115.
Chemical Society Journal (London), 1929, pages 2389–2401.